(12) United States Patent
Sommargren

(10) Patent No.: US 6,876,456 B2
(45) Date of Patent: Apr. 5, 2005

(54) ABSOLUTE CALIBRATION OF OPTICAL FLATS

(75) Inventor: Gary E. Sommargren, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 299 days.

(21) Appl. No.: 10/256,322

(22) Filed: Sep. 27, 2002

(65) Prior Publication Data
US 2004/0061866 A1 Apr. 1, 2004

(51) Int. Cl.⁷ .................................................. G01B 9/02
(52) U.S. Cl. ......................................... 356/521; 356/515
(58) Field of Search .............................. 356/512, 513, 356/514, 515, 521

(56) References Cited

U.S. PATENT DOCUMENTS

| 5,502,566 A | | 3/1996 | Ai et al. | |
| 5,548,403 A | * | 8/1996 | Sommargren | 356/513 |
| 5,933,236 A | * | 8/1999 | Sommargren | 356/513 |
| 6,344,898 B1 | * | 2/2002 | Gemma et al. | 356/513 |
| 6,704,112 B1 | * | 3/2004 | Sommargren et al. | 356/512 |

* cited by examiner

*Primary Examiner*—Samuel A. Turner
(74) *Attorney, Agent, or Firm*—John P. Woolbridge; Alan H. Thompson

(57) ABSTRACT

The invention uses the phase shifting diffraction interferometer (PSDI) to provide a true point-by-point measurement of absolute flatness over the surface of optical flats. Beams exiting the fiber optics in a PSDI have perfect spherical wavefronts. The measurement beam is reflected from the optical flat and passed through an auxiliary optic to then be combined with the reference beam on a CCD. The combined beams include phase errors due to both the optic under test and the auxiliary optic. Standard phase extraction algorithms are used to calculate this combined phase error. The optical flat is then removed from the system and the measurement fiber is moved to recombine the two beams. The newly combined beams include only the phase errors due to the auxiliary optic. When the second phase measurement is subtracted from the first phase measurement, the absolute phase error of the optical flat is obtained.

2 Claims, 3 Drawing Sheets

ABSOLUTE CALIBRATION OF OPTICAL FLATS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to high accuracy diffraction interferometry, and more specifically, it relates to the use of embodiments of the Phase Shifting Diffraction Interferometer to measure the absolute aberrations of optical flats.

2. Description of Related Art

An optical flat is generally a piece of glass (e.g., fused silica, BK7, Zerodur, ULE), having one or both surfaces carefully ground and polished piano, generally flat to less than a fraction of a wavelength. Optical flats play two important roles: as optical elements and as optical reference standards. Most optical systems contain flat-surfaced optical elements (mirrors, windows, plano-lenses, gratings, laser amplifier disks, etc.). Optical flats are also the basic standards that are used as references in interferometers to measure and qualify other optics. The absolute flatness of optical flats therefore becomes the limit on how well other optics can be fabricated.

Measuring the flatness of an optical flat at first may appear trivial—but a reference surface is needed to which the optical flat can be compared. An example is a Fizeau interferometer, shown in FIG. 1 (Prior art). A laser 10 provides a beam 12 that passes through a (second surface) beamsplitter 14. The beam is expanded and recollimated by telescope 16, which comprises a first positive lens 18 (for expanding the beam) and a second positive lens 20 (for collimating the beam). The enlarged beam 22 then passes through a reference flat 24 and is reflected from an optical flat 26 under test. The beam is reflected from the optical flat 26, then travels back towards the beamsplitter 14, from which it is reflected and imaged by an imaging lens 28 onto a charge coupled device (CCD) 30. The reference flat (auxiliary optic) 24 is used as a standard against which the optical flat 26 is compared. The reference flat contains unknown errors that limit the accuracy of measuring the true flatness of the optical flat Trying to independently measure the reference flat presents the same limitations as measuring the optical flat 26 itself. These measurement errors can be reduced (but never be completely eliminated) by averaging a number of measurements with the reference flat 24 at different lateral positions.

The surface of a liquid has been used as a reference flat, but problems with vibrations, thermal gradients, inhomogenities, surface particles (dust), the meniscus due to the walls of the container, and the curvature of the earth are all problems that limit the accuracy of such a measurement.

Over the years many techniques have been proposed to determine the absolute surface figure of optical flats using inter-comparisons between several optical flats. The common interferometric "three flat test" has been in use for decades, but this test only gives an absolute point-by-point measurement along one diameter of a flat—not over the surface area. Many researchers have tried to extend this technique by taking additional data with the flats at several rotational positions. This technique requires a polynomial fit (an approximate representation of the surface) that covers an area; however, this method does not provide accurate point-by-point information over the area.

The absolute measurement of the surface figure of an optical flat has been the subject of study ever since the invention of the interferometer over 100 years ago. Until now there has been no way found to make an absolute point-by-point measurement over an area on an optical flat Therefore, a technique is desirable that gives point-by-point measurements over such an area.

SUMMARY OF THE INVENTION

It is an object of the present invention to provide an absolute point-by-point measurement over an area on an optical flat.

This and other objects will be apparent based on the disclosure herein.

This invention provides absolute measurement of flat optical surfaces that are used in imaging systems (e.g., microscopes, telescopes, cameras, lithographic steppers, satellites), optical instruments (e.g., spectrometers, interferometers), laser systems (e.g., amplifier disks, cavity mirrors, fold mirrors, vacuum windows) and individual optical components (e.g., mirrors, lenses, windows, grating substrates, lithographic mask blanks). In addition, the invention enables the capability to manufacture and calibrate absolute flat reference standards, an important function the U.S. National Institute of Standards and Technology. NIST is a federal technology agency that works with industry to develop and apply technology, measurements, and standards. Having absolute flat reference standards will advance the capabilities of optical vendors to manufacture optics to higher accuracy since optical flats are typically used as measurement standards.

The invention uses the phase shifting diffraction interferometer (PSDI) disclosed in U.S. Pat. No. 5,548,403 and U.S. Pat. No. 5,933,236 to provide a true point-by-point measurement of absolute flatness over the surface of an optical flat The PSDI is unique and different from other interferometers in that it can be configured to provide a measurement beam and reference beam that are spatially independent and can be placed at any arbitrary positions is space. The PSDI typically uses a short coherence length laser light source to provide a beam that is passed through a specialized optical layout to produce a reference beam and a measurement beam. A phase shift is introduced in one of the beams and them each beam is focused into separate fiber optics. The beams exiting the fiber optics have perfect spherical wavefronts. The measurement beam is reflected from the optical flat and passes through an auxiliary optic to then be combined with the reference beam on a CCD. The combined beams include phase errors due to both the optic under test and the auxiliary optic. Standard phase extraction algorithms are used to calculate this combined phase error. The optical flat is then removed from the system and the measurement fiber is moved to recombine the two beams. The newly combined beams include only the phase errors due to the auxiliary optic. When the second phase measurement is subtracted from the first phase measurement, the absolute phase error of the optical flat is obtained. An embodiment of the invention is also provided for measuring the phase errors of a special type of optical flat that is used as a mirror at very short wavelengths in the x-ray region of the electromagnetic spectrum.

DETAILED DESCRIPTION OF THE INVENTION

Using the phase shifting diffraction interferometer (PSDI) disclosed in U.S. Pat. No. 5,548,403, titled "Phase Shifting Diffraction Interferometer" (PSDI) and in U.S. Pat. No. 5,933,236, titled "Phase Shifting Interferometer" both incorporated herein by reference, along with the techniques of the present invention, the errors introduced by auxiliary optics can be completely eliminated, resulting in a true point-by-point measurement of absolute flatness over the surface of the optical flat.

Figure 1:
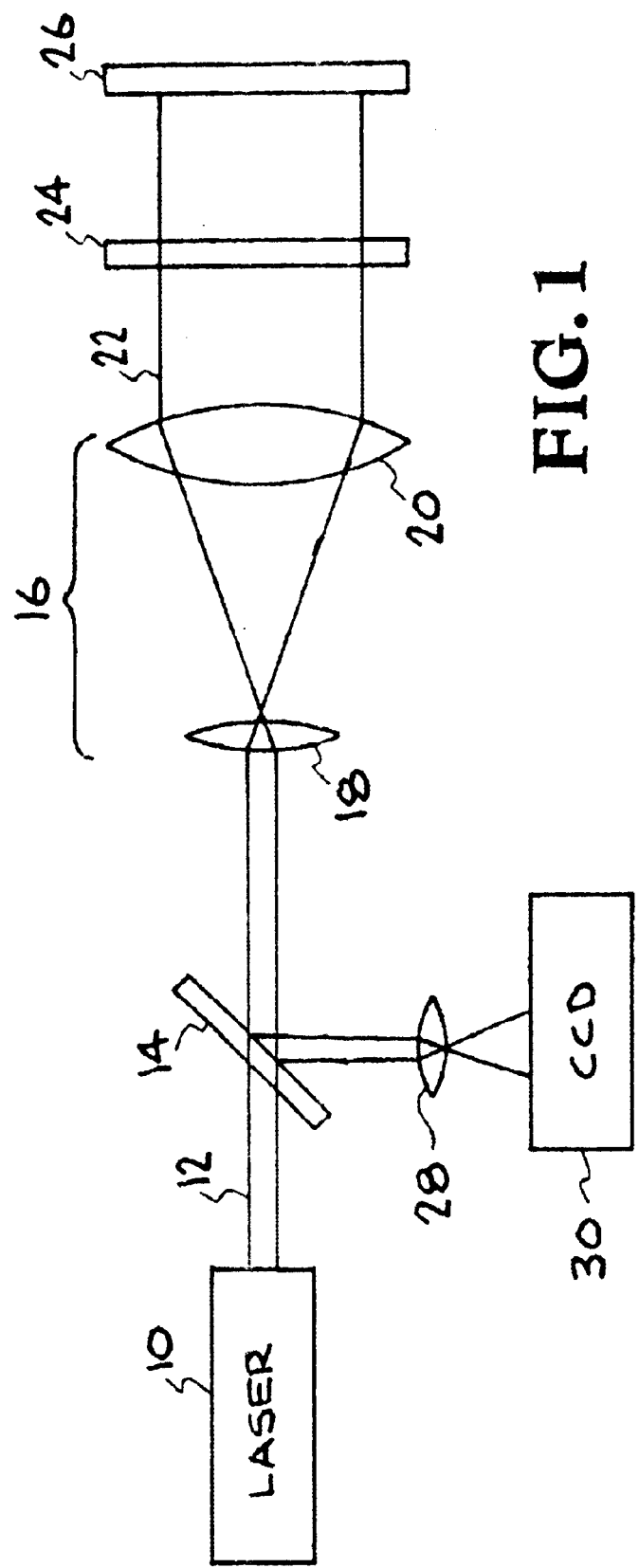
FIG. 1 shows a prior art Fizeau interferometer.
Figure 2:
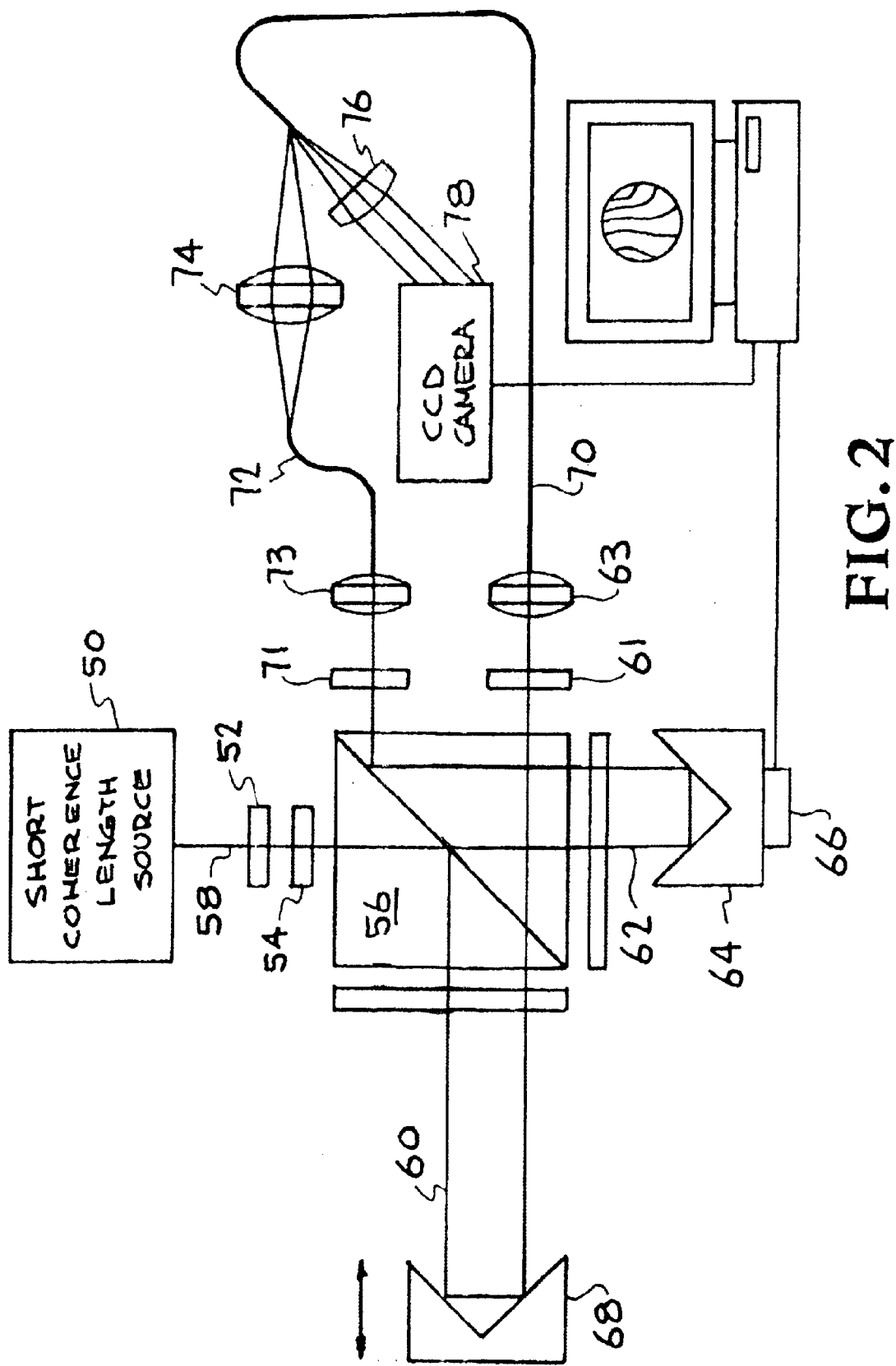
FIG. 2 shows the general layout of an embodiment of the phase shifting diffraction interferometer (PSDI).

FIG. 2 shows the general layout of an embodiment of the PSDI. This layout will serve to explain the general configuration of the present invention, as described in FIGS. 3A, 3B, 4A and 4B. In FIG. 2, the light source is a laser 50 (short coherence length is preferred to eliminate spurious interference but is not required). The variable neutral density filter 52 controls the intensity of light in the interferometer and the half-wave plate 54 controls the ratio of horizontal to vertical polarization in beam 58. The polarization beamsplitter 56 divides the incident beam 58 into two beams 60, 62. One beam (62) reflects from a retroreflector 64 mounted on a piezo-electric transducer 66 that is used to shift the phase of the beam. The other beam (60) reflects from a retroreflector 68 that can be set to ensure zero path length difference between the interfering wavefronts. Each reflected beam passes back through the polarization beamsplitter and each is focused onto the end of a single mode optical fiber. In the figure, beam 60 passes through polarizer adjuster 61 and is focused by lens 63 onto fiber 70 and beam 62 passes through polarizer adjuster 71 and is focused by lens 73 onto fiber 72. The reference fiber 70 and the measurement fiber 72 are typically the same length. The beams exiting the far end of each fiber are perfect spherical wavefronts due to diffraction from the core of the fibers. The wavefront from the measurement fiber (fiber 72 in the figure) passes through the optic 74 under test and is focused onto the exit face of the reference fiber 70 where it reflects and combines with the wavefront from the reference fiber. The two beams then pass through the imaging lens 76, which images the optic under test onto the CCD 78. Interference of the phase shifted measurement wavefront and the reference wavefront is spatially and temporally detected at each pixel within the CCD detector array. Fringe visibility of the interference pattern is set to unity with the half-wave plate 54. The phase at each pixel is then calculated from a series of phase shifted interference patterns using standard phase extraction algorithms, e.g., as described in a publication by D. W. Phillion entitled "General Methods For Generating Phase-Shifting Interferometry Algorithms", (Applied Optics, Vol. 36, pp 8098–8115 (1997)), incorporated herein by reference.

Figure 3A:
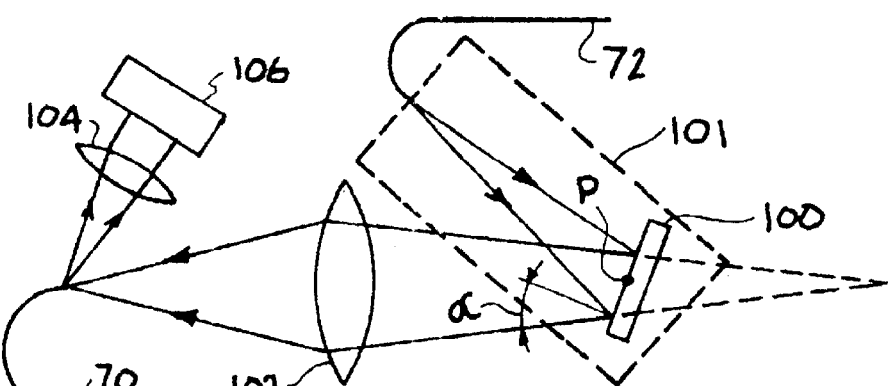
FIGS. 3A and 3B illustrate configurations of the PSDI for measuring the absolute surface figure of an optical flat.
Figure 3B:
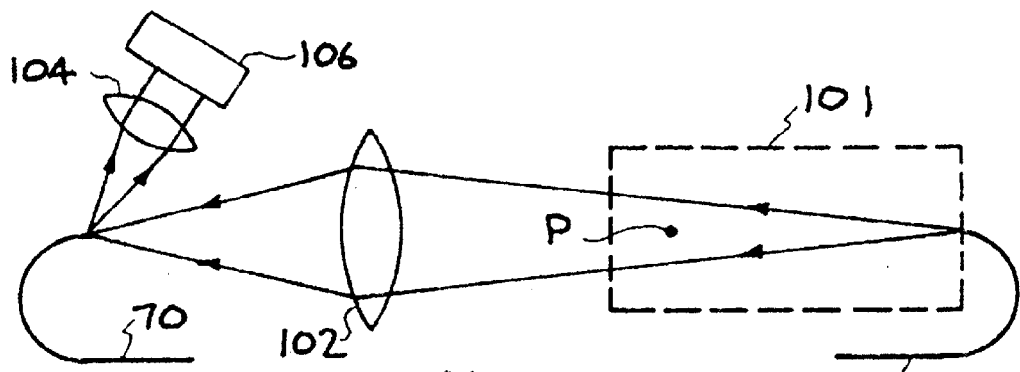

FIGS. 3A and 3B illustrate configurations of the PSDI for measuring the absolute surface figure of an optical flat. This unique capability exists because the PSDI can be configured two ways that permit subtraction of any errors introduced by the auxiliary optics. No other type of interferometer can make this claim.

In FIG. 3A, optical flat 100 is positioned in a phase shifting diffraction interferometer such that its front surface lies on the rotation axis P of rotary stage 101 that holds measurement fiber 72. A divergent wavefront is incident on the optical flat 100 from the measurement fiber 72. This wavefront is reflected from the optical flat 100 and collected by a converging lens 102 that focuses the light onto the exit face of reference fiber 70, which reflects this wavefront and also introduces the reference wavefront. The two combined wavefronts pass through the imaging lens 104, which images the optical flat 100 onto the CCD 106. Data is acquired and analyzed as described above. This measurement contains the information about the surface figure of the optical flat 100, but it also includes phase errors due to the converging lens (auxiliary optic) 102.

FIG. 3B shows how the phase errors due to the converging lens 102 are measured independently. The optical flat 100 is removed from the setup and rotary stage 101 holding measurement fiber 72 is rotated about rotation axis P so that measurement fiber 72 again is imaged onto the exit face of reference fiber 70. The measurement taken in this configuration contains only information about the phase errors introduced by the converging lens 102. Subtracting the two measurements gives the phase due only to the optical flat 100. The surface figure $s(x,y)$ of the optical flat 100 is related to the phase $\phi(x,y)$ by, $$s(x,y) = \lambda \phi(x,y)/4\pi \cos[\alpha(x,y)]$$

where $\lambda$ is the wavelength of the light source and $\alpha(x,y)$ is the angle of incidence of the measurement wavefront at coordinate $(x,y)$ on the optical flat Deviations in $s(x,y)$ from a best fit plane constitute absolute non-flatness aberrations of the optical flat 100.

Figure 4A:
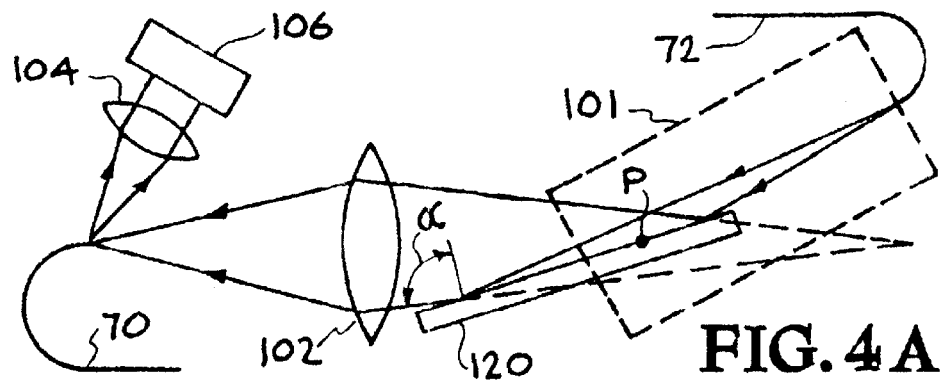
FIGS. 4A and 4B illustrate configurations of the PSDI for measuring the absolute surface figure of an optical flat used as a x-ray mirror at near-grazing angle.
Figure 4B:
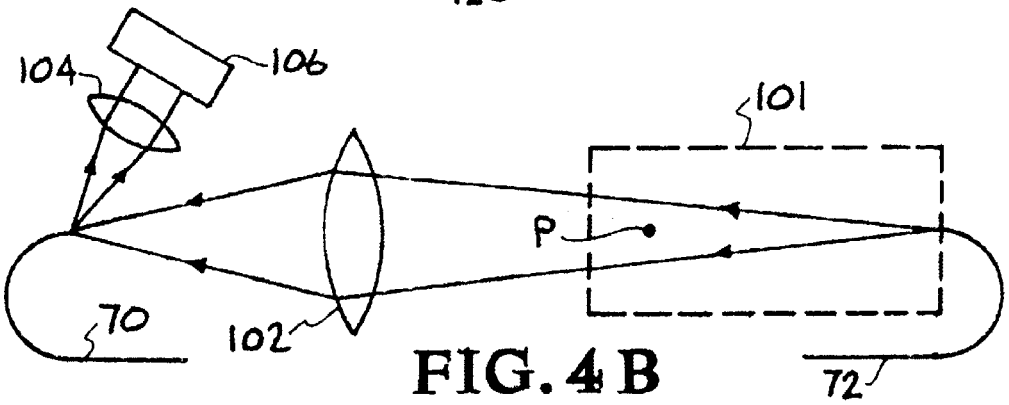

FIGS. 4A and 4B show how this measurement method can be applied to a special type of optical flat 120 that is used for a mirror at very short wavelengths in the x-ray region of the electromagnetic spectrum. These mirrors tend to be used at a grazing angle of incidence and are long in one dimension and short in the other (large aspect ratio) and can be measured the same way as described above by making the incident angle $\alpha$ close to 90 degrees.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method for measuring the phase error of an optical flat, comprising:

providing a measurement beam and a reference beam from a phase shifting diffraction interferometer (PSDI), wherein said measurement beam and said reference beam comprise a relative phase shift;

directing said measurement beam along an optical path that comprises an optical flat under test, an auxiliary focusing optic, the reflective exit face of the reference fiber of said PSDI, an imaging optic and a camera;

directing said reference beam along an optical path comprising said imaging optic and said camera, wherein said measurement beam and said reference beam combine to produce a first interference pattern on said camera;

determining from said first interference pattern the combined phase errors from said optical flat and said auxiliary optic;

removing said optical flat under test from said optical path to produce a modified optical path that comprises said auxiliary focusing optic, said reflective exit face of said reference fiber of said PSDI, said imaging optic and said camera;

redirecting said measurement beam along said modified optical path, wherein said measurement beam and said reference beam combine to produce a second interference pattern on said camera;

determining from said second interference pattern the phase error of said auxiliary optic; and substracting said phase error of said auxiliary optic from said combined phase errors from said optical flat and said auxiliary optic to provide the phase error from said optical flat.

2. The method of claim 1, further comprising determining the surface figure of said optical flat, wherein said phase error is referred to as $\phi(x,y)$, wherein surface figure is referred to as $s(x,y)$ wherein said surface figure $s(x,y)$ of said optical flat is related to said $\phi(x,y)$ by $$s(x,y)=\lambda\phi(x,y)/4\pi \cos[\alpha(x,y)]$$

where $\lambda$ is the wavelength of the light source and $\alpha(x,y)$ is the angle of incidence of said measurement beam with respect to said optical flat.

* * * * *